Jan. 10, 1933.　　　G. C. KARSHNER　　　1,893,707
TREE FERTILIZER
Filed June 27, 1932

INVENTOR
George C. Karshner
BY
ATTORNEYS

Patented Jan. 10, 1933

1,893,707

UNITED STATES PATENT OFFICE

GEORGE C. KARSHNER, OF DETROIT, MICHIGAN

TREE FERTILIZER

Application filed June 27, 1932. Serial No. 619,412.

The present invention relates to a novel method of supplying fertilizing material or food at the roots of trees or other vegetation such as grass, and the device for accomplishing the same.

Restoring trees to their natural condition by restoring the exhausted fertility of the soil supporting the same has been attempted by scattering fertilizing material on the ground surface surrounding the same and supplying water thereto so that the fertilizer seeps into the soil. This method is inefficient because the usefulness or food value of the fertilizer is exhausted to a large degree before it reaches the roots of the tree and is unsatisfactory because the fertilizer kills the plant life, such as grass, on the ground surface where the fertilizer is scattered. Another known method is to dig holes in the soil above the roots of the tree, place a quantity of fertilizer in the hole and then recover it with soil. This method is unsatisfactory because it necessitates digging in the lawns surrounding the trees and because fertilizer in quantities damages plants rather than assists their growth, and is inefficient because the food value of the fertilizer is reduced by vertical evaporation before it seeps downwardly a sufficient distance to reach the roots of the tree.

The primary object of the present invention is to provide a method and means for restoring the soil surrounding trees and similar plants to its original fertility and thereby cause rapid and vigorous growth of the tree and avoiding damage to the tree or surrounding grass by digging or concentrating the fertilizer in too great a quantity at any one point. In the present method and means the fertilizing substances are suspended in water which is forced under pressure through an injecting nozzle which is so constructed that it may be inserted in the soil to discharge adjacent the roots of the tree without damage through concentration of fertilizer or by digging the ground surface surrounding the tree.

Another object of the present invention is to provide a method and means for fertilizing trees which also serves for impregnating the soil surrounding the roots with insecticides, fungicides, or material containing chemicals that destroy insects or fungi that hinder growth of plants or vegetation.

Figure 1:
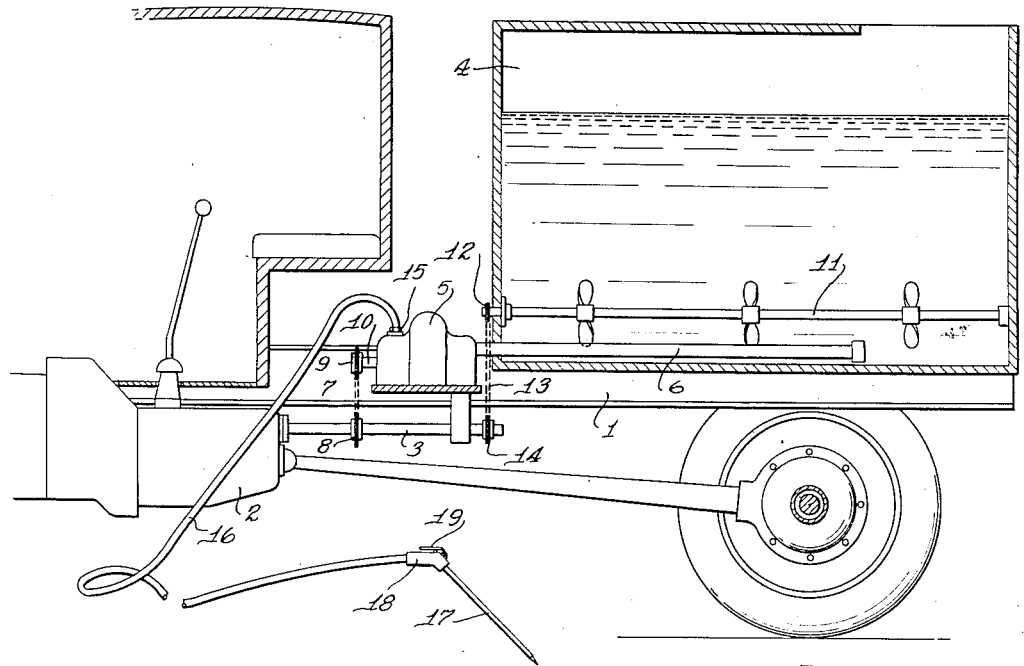
Figure 2:
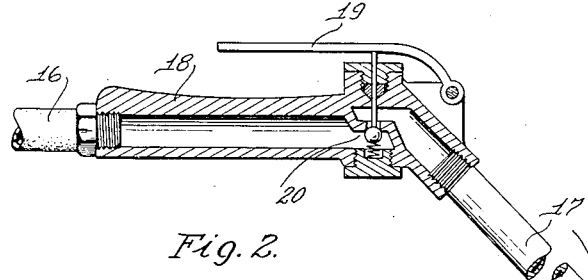
Figure 3:
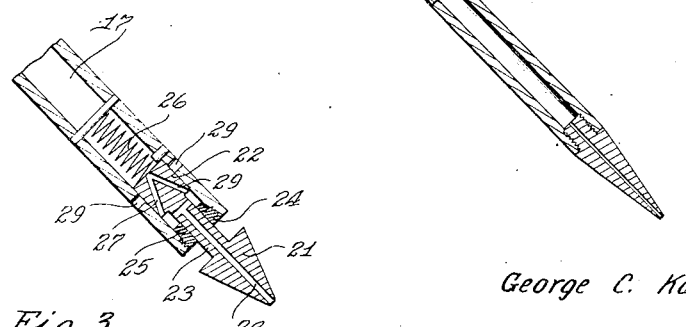

With the above and other ends in view the invention consists in matters hereinafter set forth and more particularly pointed out in the appended claim, reference being had to the accompanying drawing, in which Figure 1 is a vertical cross section of the present device mounted on a truck, a fragment of the latter being shown;

Fig. 2 is a cross section, partly in elevation, of the nozzle for injecting the fertilizer into the soil, and Fig. 3 is a cross section of a discharge fitting for the nozzle.

Like characters of reference are employed throughout to designate corresponding parts.

The numeral 1 indicates in general truck having the usual transmission 2 that is provided with a power take-off for rotating a jack-shaft 3. Mounted on the rear of the truck is a tank 4 of known capacity and adjacent the tank is a liquid pump 5 having an intake that communicates with the interior of the tank through a pipe 6. The pump is operated by a chain 7 that is trained over a sprocket 8 on the jack-shaft 2 and a sprocket 9 on the pump operating shaft 10. Inside the tank is mounted an agitator shaft 11 having one end projecting outside the tank and supporting a sprocket 12 which is connected by a chain 13 to a sprocket 14 on the jack-shaft 3.

The pump 5 is constructed so that it will not exceed a certain definite pressure and is provided with an outlet or discharge port 15 to which a hose 16 is connected. A discharge nozzle 17 is mounted on the outer end of the hose 16, the nozzle being circular in cross section and of an outside diameter that permits it to be manually inserted into soil without leaving a noticeable scar after it has been removed.

The hose 16 and the nozzle 17 are connected together through the handle 18 which is hollow. The handle 18 supports an externally pivoted lever 19 in a manner whereby pivotal movement thereof operates a valve mechanism 20. The valve lever 19 is mounted on top of the handle so that when the latter is grasped in the hand of an operator downward pressure on the handle opens the valve.

In Fig. 3 a slidable driving head 21 has a cylindrical body 22 slidably received in the end of the nozzle and a neck portion 23 that slides through a split ring 24 that is secured in the outer end of the nozzle. Mounted on top of the split ring 24 is a rubber gasket 25. A spring 26 is mounted in the nozzle to normally hold the cylindrical body 22 against the gasket 26 and passages 27 open adjacent the center of the body 22 at the top thereof and through the bottom at a point where they are closed by contact of said body 22 with the gasket 25. A passage 28 is formed in the driving head 21 and opens through the point thereof, the opposite end of the passage opening through the neck portion 23. Ports 29 are drilled in the nozzle in approximately the same relation to the sliding cylindrical body 22 as shown.

When operating the present device according to the present method the tank 4 of known capacity is filled with a definite amount of water. To the water is added a fertilizing material containing nitrogen, phosphoric acid, or potash, the proportions of which vary in accordance with the needs of the particular tree which is to be fed by supplying fertility to the soil which supports it. The agitator shaft 11 is then driven through the jack-shaft 3 and the fertilizer and water thoroughly mixed at which time the nozzle 17 may be forced into the ground by manual pressure. The nozzle 17 may be forced into the soil a distance of six inches or so and then by opening the valve 20 the water and fertilizer is pumped through the same and discharged through the outer end in a manner to wash the soil away from the end and permit the insertion of the nozzle to a depth whereby the fertilizer may be discharged into the soil adjacent roots which are a considerable distance beneath the surface of the soil.

When the driving head illustrated in Fig. 3 is used the friction of the soil against the same as it is manually pushed into the soil causes the spring 26 to become compressed and the cylindrical body to move away from the gasket 25 so that the liquid flows through the ports 27 and the port 28 and into the soil. As long as the nozzle is being pushed downwardly this action continues but when the nozzle is held stationary the liquid washes the soil away from the head and the spring 26 acts to seat the cylindrical body 22 on the gasket 25 and prevent flow through the passages 27, at which time the cylindrical body uncovers the ports 29 so that the liquid flows outwardly from the nozzle in a radial direction.

Manufactured fertilizers serve no useful purpose until they become wet and the ordinary procedure is to bury the fertilizer by digging a cavity and then wet the same by sprinkling water on the soil surface and permitting it to seep through to the fertilizer. In the present method the fertilizer is carried into the soil and scattered over a considerable area by the water. The fertilizer has immediate effect because it is evenly distributed and because of the equal distribution the fertilizer does not injure the plant life supported by the soil which receives the fertilizer. The slender, needle-like nozzle which is employed for injecting the fertilizer does not tear the ground surface and permits trees to be fed that are surrounded by lawn which cannot be destroyed or maimed by digging into the same.

Although a specific embodiment of the present invention has been illustrated and described it is to be understood that various changes may be made within the scope of the appended claim without departing from the spirit of the invention, and such changes are contemplated.

What I claim is:

A machine for fertilizing trees comprising a reservoir adapted to receive water and fertilizer, a pump having inlet and outlet ports, a pipe connected to the inlet port and extending into said reservoir, an agitator rotatably mounted in said reservoir adjacent said intake pipe, a drive shaft adapted to be connected to a power source for rotating the same, driving connections between said shaft and said pump and agitator whereby said pump and agitator are driven synchronously by said shaft, a hose connected to the outlet of said pump, and a nozzle mounted on said hose and having an elongated slender portion adapted for insertion in the ground to reach a depth adjacent the roots of a tree.

In testimony whereof I affix my signature.

GEORGE C. KARSHNER.